G. A. LE BEAU & R. R. THRESHER.
PHOTO ENGRAVING DEVICE.
APPLICATION FILED SEPT. 1, 1910.
999,115.   Patented July 25, 1911.
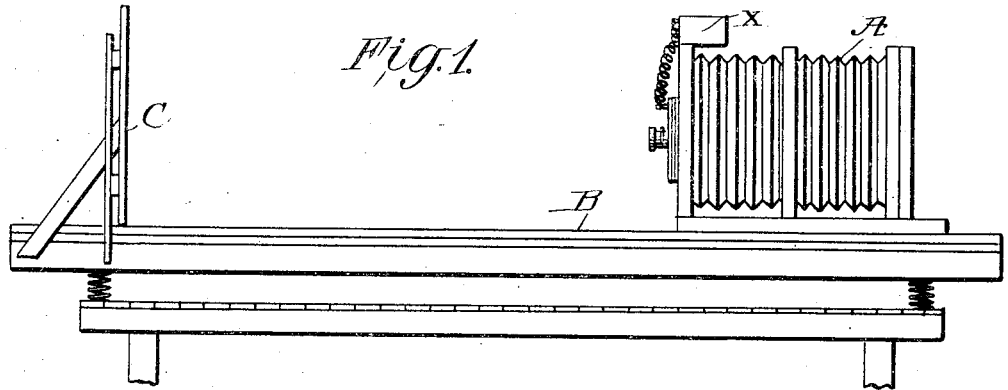
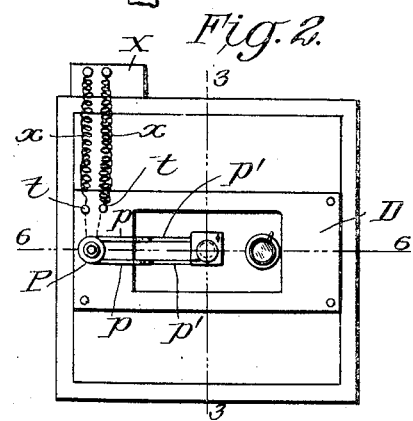
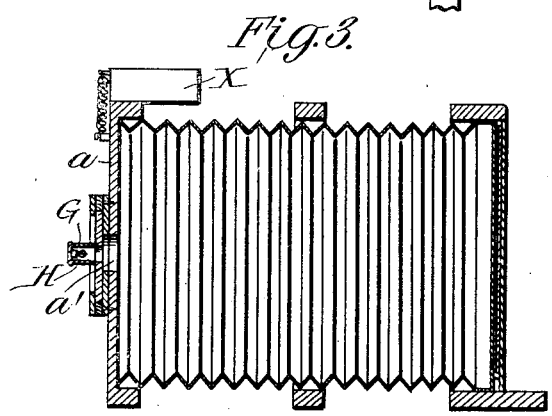
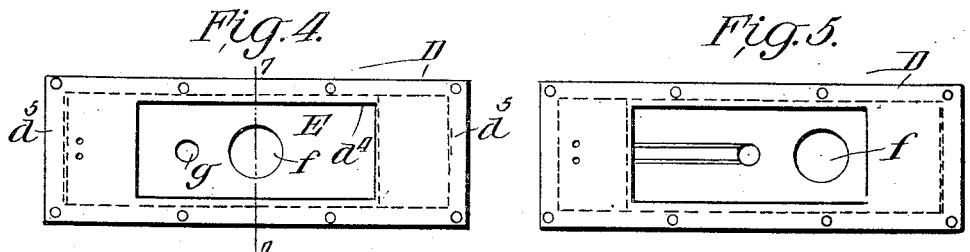
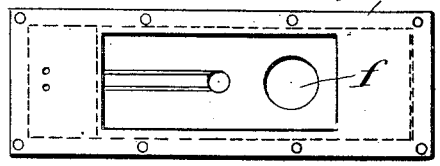
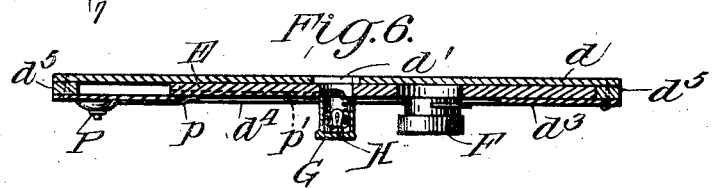
WITNESSES:
Samuel E. Wade
L. A. Stanley
INVENTORS
GEORGE A. LE BEAU
ROBERT RAYMOND THRESHER
BY Munn & Co.
ATTORNEYS

UNITED STATES PATENT OFFICE.

GEORGE AMBROSE LE BEAU AND ROBERT RAYMOND THRESHER, OF NASHVILLE, TENNESSEE, ASSIGNORS OF ONE-THIRD TO CHARLES E. NORTON, OF NASHVILLE, TENNESSEE.

PHOTO-ENGRAVING DEVICE.

999,115.

Specification of Letters Patent. Patented July 25, 1911.

Application filed September 1, 1910. Serial No. 580,137.

*To all whom it may concern:*

Be it known that we, GEORGE A. LE BEAU and ROBERT RAYMOND THRESHER, citizens of the United States, and residents of Nashville, in the county of Davidson and State of Tennessee, have made certain new and useful Improvements in Photo-Engraving Devices, of which the following is a specification.

Our invention relates to improvements in photo-engraving devices, and it consists in the combinations, constructions and arrangements herein described and claimed.

An object of our invention is to provide means whereby a negative having a better detail may be produced.

A further object of our invention is to provide means for obtaining good strong solid dots in the blacks of the negative in a minimum of time.

A further object of our invention is to provide a device for accomplishing the above mentioned objects, which is exceedingly simple in its nature and inexpensive.

Other objects and advantages will appear in the following specification and the novel features of the invention will be particularly pointed out in the appended claims.

Our invention is illustrated in the accompanying drawings in which—

Figure 1 is a side view, showing one embodiment of our invention, Fig. 2 is a front view thereof, Fig. 3 is an enlarged section from front to rear on the line 3—3 of Fig. 2, Fig. 4 is an enlarged front view of the slide holder, showing one passage of the slide, Fig. 5 is a view similar to Fig. 4, showing another passage of the slide, Fig. 6 is a section on the line 6—6 of Fig. 2, and Fig. 7 is a section on the line 7—7 of Fig. 4.

In the photo-engraving process, it has been customary, before or after exposing the plate, to place a white card immediately in front of the cop and to expose the plate to the light reflected by the white card, in order to get a hard small dot in the black of the negative. There are certain objections to this procedure. In the first place, one does not know the axact amount of light that is entering the lens of the camera after being reflected from the white sheet, for it is obvious that the amount of light depends upon the distance of the white sheet or card from the lens, the reflecting quality of the paper itself, the angle at which the reflection takes place, and other considerations which render the time of exposure mere guess work on the part of the operator. Our apparatus is designed to overcome these objections by providing a light of known candle power at a constant distance from the plate, which can be turned on or off instantly.

In carrying out our invention, we provide a camera A of the ordinary form used in photo engraving. This camera is mounted upon a base B, at one end of which is mounted a screen C for holding the copy. To the face $a$ of the camera which is provided with the opening $a'$, we attach a slide holder such as that shown at D in Figs. 4, 5. This slide holder, as will be seen from Fig. 6 consists of a back plate $d$ having an opening $d'$ adapted to register with the lens opening $a'$ in the face of the camera, a front plate $d^3$ provided with a rectangular opening $d^4$ and end and top pieces $d^5$ and $d^6$, respectively, which are placed between the front and the rear plates $d^3$ and $d$.

Between the front and rear plates $d$ and $d^3$ is a slide E. This slide bears the lens F and a cylinder G, in which is mounted a small electric light H. On one end of the slide D is secured a push button P, which is connected by means of the spring conductors $p$ to contact strips $p'$. The latter are arranged, preferably, flush with the face of the slide and are arranged to be engaged by the spring conductors $p$, as clearly shown in Fig. 6. While we have shown this electrical connection in detail, it will be understood that other means for maintaining the electrical connection between the push button and the lamp might be used, without departing from the spirit of the invention. The lamp G is connected to the conductors $p'$. On top of the camera is a battery X, which is connected, by means of the wires $x$, with the terminals $t$, the latter being connected with the push button P, as clearly shown in Fig. 2.

The slide E is so arranged that when it is pushed to one end, the lens opening $f$ will register with that of the back plate $d$ of the slide holder and also with the lens opening $a'$ in the face of the camera. A smaller opening $g$ is provided, and this opening will be in the center of the openings $d'$ when the slide is pushed to the opposite end of the slide holder.

From the foregoing description of the various parts of our device, the operation thereof may be readily understood.

In making the exposure on the negative, the copy is secured to the screen C, and the lens F is brought into position for making the exposure. After the exposure is made, the slide E is pushed so as to bring the light G in the position previously occupied by the lens F and the button P is manipulated so as to cause the light G to glow. Since this light is of a given candle power and the distance from the light to the negative is always the same, one may soon determine the exact time needed to give the best detail to the negative. On relieving the pressure of the push button, the lamp immediately goes out and the plate may then be removed.

In the use of our invention, it will be seen that the lens or the light may be brought to the center of the camera by a single movement, thereby doing away with the necessity of placing and replacing the white reflecting surface in ordinary use. Good results can be obtained in fifteen to twenty seconds, while with the old method a longer time is required and the results then are not as good as when our device is used.

We claim:

1. In a photo-engraving device, a camera provided with a holder for a sensitive plate, a slidable lens holder for said camera, and a source of light carried by said lens holder and adapted to be brought into position for exposing said plate.

2. In a photo-engraving device, a camera provided with a holder for a sensitive plate and having a face provided with an opening, a slide holder secured to the face of said camera, a slide carried by said slide holder, and a lens and a source of light mounted on said slide, each being adapted to be brought into registration with the opening in the face of said camera.

3. In a photo-engraving device, a camera provided with a holder for a sensitive plate and having a face provided with an opening, a slide holder secured to the face of said camera, a slide carried by said slide holder, a lens and a cylinder mounted on said slide, and an incandescent lamp carried within said cylinder, said lamp and said lens each being adapted to be brought into registration with the opening in the face of the camera.

4. In a photo-engraving device, a camera provided with a holder for a sensitive plate and having a face provided with an opening, a slide holder secured to the face of said camera, a slide carried by said slide holder, a lens and a cylinder mounted on said slide, an incandescent lamp carried within said cylinder, said lamp and said lens each being adapted to be brought into registration with the opening in the face of the camera, a push button carried by said slide holder, sliding connections between said push button and said lamp, a source of current, and connections between said source of current and said push button.

GEORGE AMBROSE LE BEAU.
ROBERT RAYMOND THRESHER.

Witnesses:
MELVIN G. LOWE,
ERNEST F. CARROLL.